US012123239B2

(12) United States Patent
Fässler et al.

(10) Patent No.: US 12,123,239 B2
(45) Date of Patent: Oct. 22, 2024

(54) DOOR APPARATUS AND PARKING APPARATUS EQUIPPED THEREWITH

(71) Applicants: Klaus Multiparking GmbH, Aitrach (DE); Norbert Fässler, Haslach (DE); Philipp Kartheininger, Fellheim (DE); Dieter Melder, Türkheim (DE)

(72) Inventors: Norbert Fässler, Haslach (DE); Philipp Kartheininger, Fellheim (DE); Dieter Melder, Türkheim (DE)

(73) Assignee: Klaus Multiparking GmbH, Aitrach (DE)

(*) Notice: Subject to any disclaimer, the term of this patent is extended or adjusted under 35 U.S.C. 154(b) by 186 days.

(21) Appl. No.: 17/792,018

(22) PCT Filed: Oct. 22, 2020

(86) PCT No.: PCT/EP2020/079710
§ 371 (c)(1),
(2) Date: Jul. 11, 2022

(87) PCT Pub. No.: WO2021/139908
PCT Pub. Date: Jul. 15, 2021

(65) Prior Publication Data

US 2023/0052115 A1 Feb. 16, 2023

(30) Foreign Application Priority Data

Jan. 10, 2020 (DE) ..................... 10 2020 100 418.4

(51) Int. Cl.
*E05F 15/00* (2015.01)
*E04H 6/18* (2006.01)
(Continued)

(52) U.S. Cl.
CPC ............. *E05F 15/00* (2013.01); *E04H 6/188* (2013.01); *E05B 65/0876* (2013.01);
(Continued)

(58) Field of Classification Search
CPC ......... E05F 15/00; E05F 15/57; E05F 15/668; E04H 6/188; E04H 6/42; E05B 65/0876;
(Continued)

(56) References Cited

U.S. PATENT DOCUMENTS

| | | | |
|---|---|---|---|
| 1,332,956 | A | 3/1920 | Rush |
| 1,486,653 | A | 3/1924 | Geroux |

(Continued)

FOREIGN PATENT DOCUMENTS

| | | | |
|---|---|---|---|
| CN | 201972527 | U | 9/2011 |
| DE | 7911101 | U1 | 12/1979 |

(Continued)

OTHER PUBLICATIONS

German Office Action for German Application No. 102020100418.4 dated Oct. 27, 2020 (12 pages).

(Continued)

*Primary Examiner* — Chi Q Nguyen
(74) *Attorney, Agent, or Firm* — REISING ETHINGTON, P.C.

(57) ABSTRACT

A door apparatus for closing an access opening and to a parking apparatus equipped therewith. The door apparatus has two vertically aligned guide rails and an inner and an outer door element which are each movably mounted in/on a vertically aligned inner or outer guide of the guide rails. In a closed position, the inner door element is arranged in a first region of the access opening which is situated lower than a second region in which the outer door element is arranged. In an open position, the inner and the outer door element are arranged in a third region of the access opening which is situated higher than the first and the second region. Furthermore, the door apparatus has a locking element and a coupling element.

18 Claims, 4 Drawing Sheets

(51) Int. Cl.

| | |
|---|---|
| ***E05B 65/08*** | (2006.01) |
| ***E05D 15/18*** | (2006.01) |
| ***E06B 3/92*** | (2006.01) |
| *E06B 3/70* | (2006.01) |

(52) U.S. Cl.
CPC .............. *E05D 15/18* (2013.01); *E06B 3/925* (2013.01); *E05Y 2201/43* (2013.01); *E05Y 2201/656* (2013.01); *E05Y 2201/684* (2013.01); *E05Y 2900/106* (2013.01); *E06B 2003/7044* (2013.01)

(58) Field of Classification Search
CPC ...... E05B 65/0882; E06B 3/925; E06B 3/927; E06B 2003/7044; E05D 15/16; E05D 15/18; E05D 15/22; E05Y 2201/43; E05Y 2201/656; E05Y 2201/684; E05Y 2900/106
See application file for complete search history.

(56) References Cited

U.S. PATENT DOCUMENTS

| | | | | |
|---|---|---|---|---|
| 1,751,358 A | | 3/1930 | Rice et al. | |
| 2,575,255 A | * | 11/1951 | Blodgett | E06B 3/485 16/97 |
| 3,313,338 A | | 4/1967 | Knight | |
| 4,194,549 A | * | 3/1980 | Lovgren | E06B 9/262 160/84.02 |
| 4,363,348 A | * | 12/1982 | Heikki | E06B 9/262 160/84.02 |
| 4,884,831 A | * | 12/1989 | Emon | E05F 15/673 292/38 |
| 6,860,311 B1 | * | 3/2005 | Minor | E05D 15/18 160/202 |
| 11,002,064 B2 | * | 5/2021 | Hall | E04B 2/827 |
| 11,105,133 B2 | * | 8/2021 | Sauve | E05D 15/242 |
| 11,359,372 B2 | * | 6/2022 | Hall | E04B 2/7405 |
| 2018/0002971 A1 | * | 1/2018 | Grace | E06B 3/483 |
| 2018/0230732 A1 | * | 8/2018 | Tseng | E06B 9/0676 |
| 2020/0355023 A1 | * | 11/2020 | Fazio | E05F 1/08 |
| 2020/0399102 A1 | | 12/2020 | Fäßler et al. | |
| 2021/0254382 A1 | * | 8/2021 | Kicher | E05D 15/24 |
| 2023/0323716 A1 | * | 10/2023 | Kicher | E05D 13/12 49/200 |

FOREIGN PATENT DOCUMENTS

| | | |
|---|---|---|
| DE | 202019100778 U1 | 5/2019 |
| KR | 20030000014 A | 1/2003 |

OTHER PUBLICATIONS

International Search Report for International Application No. PCT/EP2020/079710 dated Feb. 11, 2021 (16 pages).
English Translation of International Search Report for International Application No. PCT/EP2020/079710 dated Feb. 11, 2021 (2 pages).

* cited by examiner

DOOR APPARATUS AND PARKING APPARATUS EQUIPPED THEREWITH

INTRODUCTION

The disclosure relates to a door apparatus and a parking apparatus equipped therewith.

From the prior art, various doors and closure systems therefor are known in order in particular to safeguard parking spaces for vehicles against unauthorized access and external influences. Thus, in particular there are pivot doors, overhead doors and sectional doors which for opening are each moved over a vehicle. Furthermore, there are rolling and folding doors which can be rolled up or folded together above the door opening. However, all these solutions require space above the vehicle, both for the end position and in the region through which the door and the drive elements move. Particularly in multi-parking systems for space-saving accommodation of several vehicles, such a space is not provided, for example, in so-called double parkers, duplex parkers or stacking parkers, as described, for example, in DE 20 2019 100 778 U1. This is because, in this instance, at least two vehicles are accommodated one above the other in a single parking space, in particular using a movable platform. Generally, one of the two vehicles can always be removed, but the other can be removed only when no second vehicle is parked in the parking space. These stacking parkers are increasingly used in underground car parks in which the usable structural space is fixedly predetermined. In order to be able to accommodate the largest vehicles possible in a small structural space, the platform should be constructed to be as large as possible. There is accordingly little structural space available for the door device. In this instance, lateral sliding doors can sometimes be used when a door segment can be pushed completely laterally out of the access opening, that is to say, particularly when an adjacent second parking space can also be integrated in the door system. With individual parking spaces, however, this is not practicable at all. For comfortable operation, the smallest possible number of hand actions should be required, in particular in order to activate the locking of the door and to move the door.

A locking system for a sectional door is known, for example, from DE 60 2006 000 733 T2. This system has a lock case and a central bar.

SUMMARY

An object according to an embodiment is to provide a technical solution for closing an access opening of a parking space and a parking apparatus equipped therewith which take up as little space as possible, enable secure and comfortable operation and can be produced in a cost-effective manner in large batch quantities.

The disclosure relates to a door apparatus for closing an access opening, having two vertically orientated guide rails which laterally delimit the access opening. It has an outer door element which is displaceably supported in or on a vertically orientated outer guide of the guide rails. Furthermore, the door apparatus has an inner door element which is displaceably supported in or on an inner guide of the guide rails which extends in a parallel manner adjacent to the outer guide. In this instance, in a closed position of the door apparatus the inner door element is arranged in a first region of the access opening which is located lower than a second region in which the outer door element is arranged. In an open position of the door apparatus, the outer door element and the inner door element are arranged in a third region of the access opening which is higher than the first and second regions. In this instance, part-regions of the first and second region and the second and third region may overlap each other. The door apparatus further has a locking element for bringing about a blocking state in which the locking element blocks the displaceable bearing of the inner door element relative to the two guide rails in the closed position. Furthermore, the door apparatus has on one of the inner and outer door elements a coupling element which cooperates with the other of the inner and outer door elements in such a manner that the locking element blocks the displaceable bearing of the outer door element in the blocking state relative to the two guide rails indirectly via the inner door element.

Consequently, on the one hand, the access opening can be opened with little spatial requirement in that the inner and the outer door elements can simply be pushed upward. Therefore, this is a type of vertical door. On the other hand, the door can be comfortably blocked by exclusively a direct blocking of the inner door element being carried out. The inner door element holds the outer door element down to some degree. In a specific embodiment, therefore, there is provision for the coupling element to be configured as a holding-down member in such a manner that the inner door element blocks the outer door element in at least one operating state against displacement in an upward direction. Preferably, per an embodiment, the coupling element further cooperates with the other of the inner and outer door elements in such a manner that no gap can be pushed open between the outer door element and the inner door element. In this instance, it is possible for the coupling element to be an integral component of the inner or outer door element. However, it may also be constructed separately and be secured to the inner or outer door element. The door elements should be supported so as to be able exclusively to be linearly moved, that is to say, by means of displacement and in particular in a vertical direction. Consequently, free space is required for the movement thereof only in the movement path of the door elements. The outer door element should not be able to be pushed into the first region. A stop is preferably, per an embodiment, constructed for this purpose on at least one of the guide rails on which the outer door elements is positioned in the lowest position thereof.

Preferably, per various embodiments, the installation and movement space of the inner and outer door element is less than 120 mm, more preferably less than 100 mm and in a particularly preferred manner less than 80 mm deep perpendicularly to the door elements. Consequently, the door apparatus hardly limits the available storage space, for example, a passenger vehicle parking space. Accordingly, for example, larger platforms and passenger vehicles can be accommodated in the storage space.

In order to achieve the blocking state of the inner door element, it may be advantageous, per an embodiment, for at least one locking position to be provided along the inner guide in at least one of the guide rails, with which position the locking element can be brought into engagement. So that the inner door element does not simply fall down in the event of a drive becoming damaged, it may be additionally advantageous, per an embodiment, for a plurality of locking positions to be arranged in a state distributed along the inner guide, with which positions the locking element can be brought into engagement in various positions of the inner door element. The locking positions may be recesses, holes, punched-out portions or cavities. In this instance, an extent of the locking position in the direction of the inner guide which is greater than the locking element requires is advantageous, for example, elongate holes. Consequently, the locking element even at higher movement speeds of the inner door element can be brought into engagement with the locking position. No locking positions have to be provided along the outer guide. According to a specific embodiment, the coupling element cooperates with the other of the inner and outer door elements in such a manner that the inner door element can be pushed by at least 50%, preferably at least 60%, more preferably at least 70% and in a particularly preferred manner at least 80% beside (or behind when viewed from the front) the outer door element. This may have the advantage that a relatively large portion of the access opening can be released without, for example, a pivoting of the door elements being required.

Advantageously, per an embodiment, the coupling element is in the form of a carrier in such a manner that the inner door element also carries the outer door element in at least one operating state. In this operating state, therefore, only the inner door element has to be activated.

In an optional embodiment, there is provision for the coupling element to cooperate with the other of the inner and outer door elements in such a manner that the inner door element during displacement into the third region also pushes the outer door element from the second region into the third region. Consequently, an actuation force which acts only on the inner door element is sufficient to open and close the door apparatus.

Optionally, there is provision for the coupling element to be a rigid non-movable element which is formed or arranged on the inner or outer door element. This can be implemented in a structurally simple manner, is cost-effective and also durably stable in a wear-free manner.

In principle, it is possible for the coupling element to have a plurality of individual elements which are arranged in a state distributed over the spacing between the two guide rails. The force which can be transmitted is thereby increased and distributed over the width of the door elements.

Another option involves the coupling element engaging behind the other of the inner and outer door elements in the closed position, preferably in a similar manner to a hook, per an embodiment, and preferably in such a manner that the inner and the outer door elements can be bent only together. The anti-theft protection is thereby increased.

According to a more detailed embodiment, the coupling element is arranged on the inner door element, preferably in the region of the upper end thereof. Consequently, in particular all the mechanical structures of the coupling element can be formed on the inner side of the door elements. Consequently, they cannot be manipulated from the exterior as a result of unauthorized access and are further arranged so as to be concealed.

In a specific embodiment, the coupling element protrudes in such a manner from behind between an upper and a lower frame profile of the outer door element that it is arranged in the closed position adjacent, in particular at the upper side, with respect to the lower frame profile and in the open position adjacent, in particular at the lower side, with respect to the upper frame profile. Consequently, the coupling element on the lower frame profile may act as a holding-down member and on the upper frame profile as a carrier. The coupling element should be freely displaceable between the lower and upper frame profiles.

For a high level of operating comfort, there is optionally provision for the inner door element to be displaceably driven along the inner guide with a lifting drive.

In this instance, there may be provision for the lifting drive to have a motor which is preferably, per an embodiment, arranged in the height range of the two upper ends of the two guide rails. Using a motor, automatic opening is possible.

Furthermore, the lifting drive may have a chain, preferably a roller chain in an embodiment, which is secured to the inner door element. It can be arranged in a space-saving manner and may in particular be simply guided vertically in an upward direction above the inner door element. Furthermore, chains enable in a simple manner a non-resilient coupling including the option of directional changes.

In an embodiment, the outer door element is exclusively also driven indirectly by means of the inner door element with the lifting drive. This enables a simple implementation of the door drive.

The door apparatus can be supplemented in that it has an emergency unlocking device by means of which the blocking state can be manually cancelled, in particular in order to be able to push the inner door element manually upward. Consequently, depending on the application, safety provisions for an emergency opening can be complied with. Preferably, per an embodiment, the emergency unlocking device has an actuation element at the inner side of the door apparatus. Consequently, a person who is locked in can free him/herself. Optionally, the blocking state can be detected with a sensor or switch. This information relating to the blocking state may, for example, be used with a control unit of the lifting drive or also by an alarm system.

In detail, the locking element may be coupled to the lifting drive in such a kinematic manner that the locking element, in the closed position and when the lifting drive is unloaded, automatically takes up the blocking state. Consequently, the door is automatically locked when it is moved into the closed position. Preferably, per an embodiment, this coupling is also configured to act in the opposite direction, that is, in such a manner that the application of a lifting force with the lifting drive cancels the locking state of the locking element and the door element is subsequently moved with displacement.

Optionally, a special locking apparatus is provided for this purpose. Such a locking apparatus for locking door elements may have a housing and an actuation element and a locking element. The actuation element and the locking element are in this instance coupled kinematically to each other in such a manner that the locking element in the unloaded state of the actuation element takes up a locking state and, when the actuation element is loaded with a tensile force, takes up an unlocking position, wherein there is provided a lifting element by means of which the tensile force can be applied or is applied to the actuation element, wherein the tensile force preferably, per an embodiment, acts geodetically in a vertically upward direction.

In a specific embodiment of the locking apparatus, in the locking state the locking element is moved into a locking position or urged (at least) in the direction of this locking position, wherein the locking element in the locking position preferably, per an embodiment, protrudes from a first side of the housing.

The housing of the locking apparatus should be secured to the inner door element, wherein the locking element in the locking position is in engagement with the guide rail in such a manner that a displacement of the inner door element along the displaceable bearing is blocked, and the locking element in the unlocking position is arranged in such a manner that a displacement of the inner door element along the displaceable bearing is released.

It is thereby possible for the locking state to be permanently present without an actuation force being applied. As a result of the tensile force, on the one hand, the locking can be released and, on the other hand, tension can be directly applied to the housing, whereby the inner door element which may be connected to the locking apparatus can finally be moved. Consequently, only one movement action for unlocking and movement is required, that is to say, the tensile force. Optionally, this can be applied manually or by means of a drive. The lifting element is preferably, per an embodiment, constructed in a non-rigid manner. In particular, the lifting element is, for example, a cable, a wire, a chain or in particular a roller chain. The lifting element may be connected directly to the actuation element, or a rigid intermediate portion is arranged between the non-rigid lifting element and the actuation element.

In a specific embodiment of the locking apparatus, the locking element is moved in the locking state into a locking position or is urged (at least) in the direction of this locking position, wherein the locking element in the locking position preferably, per an embodiment, protrudes from a first side of the housing. The locking element can thereby engage in a counter-piece, in particular in one of the guide rails, and can block a movement of the locking apparatus in the direction of the tensile force. The urging of the looking element is intended to be understood to be a loading of the locking element which leads to the locking state, as long as the locking element is not impeded in its movement by third members. This is the case, for example, when locking positions which are arranged individually in a distributed state are provided on a guide rail. The locking element protrudes in the locking position preferably, per an embodiment, transversely relative to the tensile force from the first side of the housing. Preferably, per an embodiment, the locking element is arranged in the locking position to a greater extent than in the locking position or completely inside the housing. As a result of this position, the locking element releases a movement of the entire locking apparatus in the direction of the tensile force, particularly when there is no longer any engagement with a counter-piece which would block this movement.

According to a specific embodiment, the locking element in the unloaded state of the actuation element is moved by means of gravitational forces and/or a resilient force into the locking state. Consequently, the locking state is maintained even when drives fail or any power supply is interrupted. Preferably, per an embodiment, the locking state in the unloaded state of the actuation element is substantially maintained in the locking state by means of the resilient force and in addition by the gravitational forces. Consequently, the locking state is maintained even in the event of damage to the spring. The gravitational forces may, for example, act directly on the locking element, or indirectly on the locking element via the actuation element.

Furthermore, the actuation element in the unloaded state can be maintained in the locking state by means of gravitational forces and/or a resilient force. It is accordingly thereby possible for no unlocking to be carried out in the event of a failure of a drive or a power interruption.

In a specific embodiment, the resilient force is brought about by a spring, preferably, per an embodiment, a helical spring. Preferably, per an embodiment, the helical spring is pushed onto the locking element. Consequently, it is securely guided and retained in position. If a helical spring is used, the wire diameter thereof should be greater than the spacing between the windings. In the event of a spring fracture, consequently, the two fragments can be prevented from being pushed and/or screwed into each other so that even then the function of the spring remains maintained to the greatest possible extent. Generally, the resilient force should be configured in such a manner that the spring moves the locking element with the unloaded actuation element into the locking position and/or retains it at that location. Furthermore, a configuration of the resilient force of the spring may be advantageous, per an embodiment, in that the actuation element is moved with the tensile force into the unlocking position before the tensile force exceeds the weight force of the locking apparatus and the connected inner door element. In specific terms, the resilient force of the spring may be configured in such a manner that the locking element leaves the unlocking position when a value is less than the weight force of the locking apparatus and the inner door element by a safety value, particularly, for example, when the locking apparatus or the inner door element strike an object. In other words, the locking element may be extended when there is no contact, for example, when the inner door element collides with a person. By configuring the resilient force based on the weight which is intended to be lifted, the counter-force which has to act from below against a door element until the locking element is moved into the locking state can be defined. This counter-force is preferably only a fraction of the actual door element weight, per an embodiment. Actively detecting switching strips on the lower edge of a door element can thus be completely dispensed with. Optionally, there may be provision for the resilient force of the spring to be configured to be adjustable. This is, for example, as a result of an adjustable spring seat, or spacer elements/washers for the spring seat, or simply by means of a set of replacement springs with different resilient force. Consequently, the resilient force can be adapted individually to the weight of a door element.

Preferably, per an embodiment, the locking element is supported in a linearly displaceable manner in the housing. Such a bearing is stable and accordingly locks in a manner capable of resisting unauthorized opening. The optional spring may in this instance, for example, be positioned on the locking element, and be clamped between a spring seat of the locking element and a linear bearing which is arranged in a fixed manner in the housing. In a specific embodiment, the actuation element is coupled to the locking element by means of a mechanical gear mechanism. This results in a robust and not very error-prone effective connection for the activation. In detail, the actuation element may be a pivotably supported actuation rocker arm. With this rocker arm, in a simple structural manner, a force can be redirected, for example, from a vertical force direction into a horizontal force direction. Furthermore, the actuation element may be coupled to the locking element by means of a slotted guiding member. In the simplest case, the slot of the slotted guiding member is a linear elongate hole.

It has further been found to be advantageous, per an embodiment, for the locking element in the unlocking position to strike a stop and for the tensile force to be introduced at least partially from the actuation element via the stop into the housing. Consequently, a defined end position is reached. Additionally or alternatively, the actuation element in the unlocking position can strike a stop and the tensile force is at least partially introduced by the actuation element via the stop into the housing. On the one hand, a loading of the kinematic coupling between the locking element and actuation element is thereby reduced, and, on the other hand, the tensile force is redirected for another task, in particular pulling open a door element, that is to say, into the housing as a stable structure which can be secured to such a door element. Accordingly, the locking element is then not so powerfully loaded.

For safety reasons, an additional feature may be advantageous, per an embodiment, according to which the locking apparatus has a sensor system or a switch which detects at least one possible position of the locking element, preferably the unlocking position. The detection of this position can be transmitted, for example, to a control unit.

In an embodiment, the housing is constructed in a parallelepipedal manner, wherein it is constructed to be longer than high and higher than deep, whereby the housing forms three differently sized side face pairs, wherein the largest side face pair has a front side and a rear side, the medium-sized side face pair has an upper side and a lower side, and the smallest side face pair forms two opposing end faces. Such a planar housing can be secured in a particularly compact manner to the inner door element, or integrated therein, which as such in most cases also has a planar parallelepipedal outer contour. To this end, the housing should be constructed to be at least twice as high as deep. A shape in which the housing is constructed to be at least twice as long as high may be further advantageous, per an embodiment.

According to a more detailed embodiment, the locking element is arranged in the region of one of the two end faces. Consequently, the locking element is positioned on one of the two smallest sides and the two larger side pairs provide a stable connection to a door element.

In this instance, there may be provision for the housing to have at the lower side securing holes or securing elements by means of which the housing can be secured to an underlying surface, in particular to the inner door element or the door profile thereof.

Furthermore, there may be advantageously provision for the actuation element to be arranged in the region of the upper side of the housing so as to be able to be activated from outside the housing, per an embodiment. Consequently, the locking apparatus is suitable in particular for door elements, such as the inner door element, which is intended to be pulled upward, in particular with the tensile force which acts on the actuation element.

Preferably, per an embodiment, the housing forms in the region adjacent to the actuation element a storage face for the lifting element. A portion of the lifting element can thus be placed in the locking state on the storage face of the housing. It is thereby ensured that no more traction acts on the actuation element and the locking element is not retained in the unlocking position. Furthermore, as a result of the defined storage, it is ensured that the lifting element during or prior to the application of the tensile force carries out a defined movement until it finally applies the tensile force to the actuation element.

Furthermore, an emergency unlocking device which can be activated from outside the housing can optionally be coupled kinematically to the locking element in such a manner that the locking element as a result of manual activation of the emergency unlocking device can be moved into an emergency unlocking position, wherein the emergency unlocking position preferably corresponds to the unlocking position, per an embodiment. Consequently, a person who is locked in can, for example, free him/herself. In order to overcome the force acting in the locking state, a lever may be provided for this purpose. The lever may optionally also be positioned spaced apart from the housing and may, for example, cooperate with the locking element by means of a wire pull or Bowden cable.

Furthermore, there may be advantageously provision, per various embodiments, for a projection to protrude beyond the housing, particularly in a transverse direction relative to the locking element and preferably also in a transverse direction relative to the actuation element and can preferably be used as a holding-down member and/or as a carrier. This projection can be used as a coupling element of the door apparatus. This is because this projection can limit the other door element in terms of movement, for example, hold it down, or instead it pulls the additional door element. The projection should particularly protrude beyond the front side of the housing. Furthermore, the projection should in the region of the lower side protrude over the front side of the housing. Consequently, a second door element can thus be guided at least almost in a congruent manner with the first door element to which the housing is connected. The access opening is thus released to the maximum extent.

The disclosure further relates to a parking apparatus for parking objects, in particular vehicles, at least comprising at least one platform which can be positioned by means of a movement device relative to an access opening with a parking surface and a door apparatus, as described above and below, which is arranged in the access opening. As a result of the door apparatus, the storage space of the parking apparatus for objects which are arranged on and below the platform is kept free to the greatest possible extent.

BRIEF DESCRIPTION OF THE FIGURES

Other features, details and advantages of the invention will be appreciated from the wording of the claims and from the following description of embodiments with reference to the drawings, in which:

DETAILED DESCRIPTION

Figure 1:
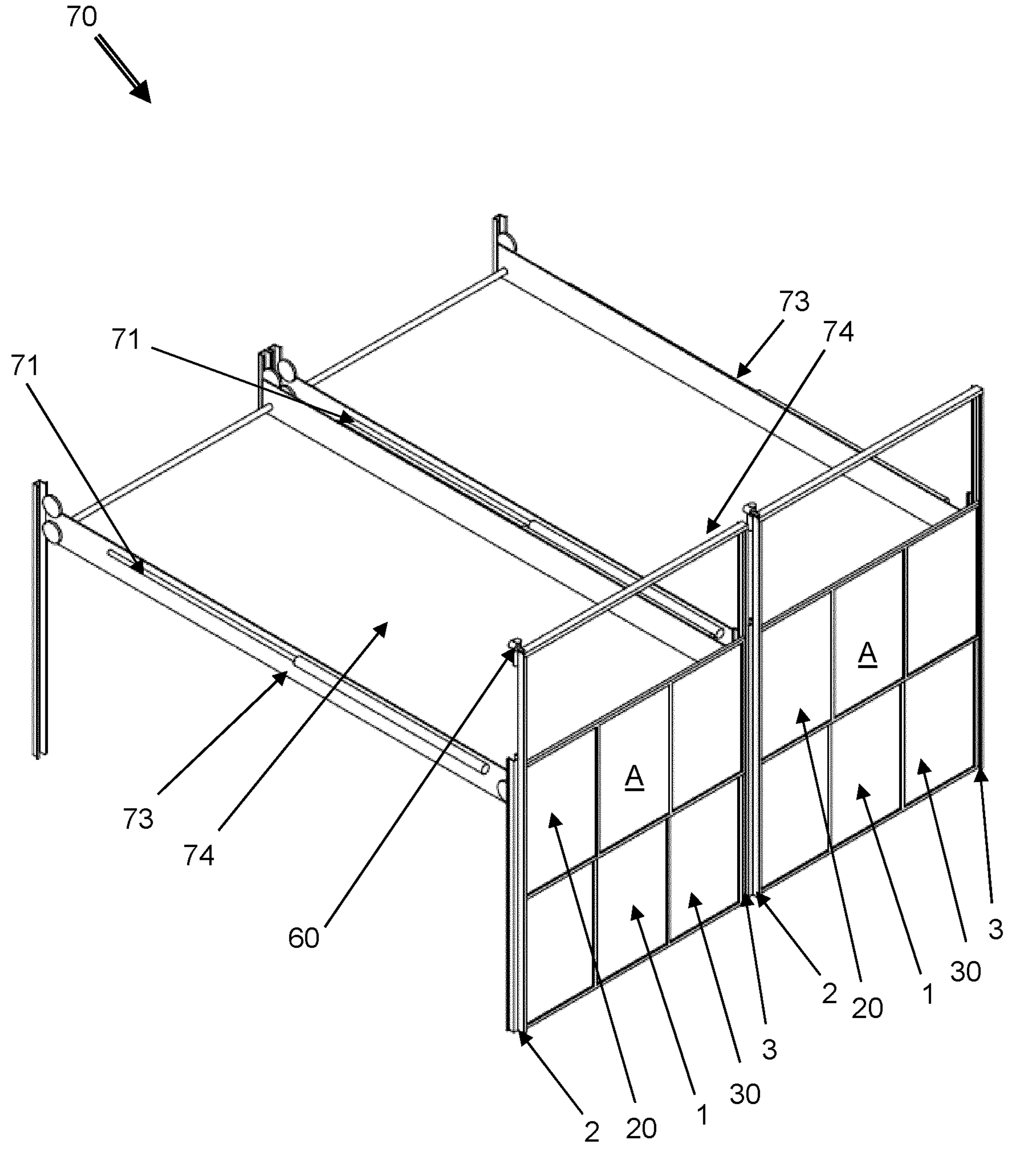
FIG. 1 shows an oblique, perspective view of a parking apparatus with two door apparatuses arranged adjacent to each other.

FIG. 1 shows an oblique perspective view of a parking apparatus 70 having two adjacent door apparatuses 1. The parking apparatus 70 is used for parking vehicles and has two platforms 73 which are arranged beside each other and which can be positioned by means of a movement device 71 in each case relative to an access opening A and which each have a parking surface 74. One of the two door apparatuses 1 is arranged in the access openings A in each case.

Below, only one of the two door apparatuses 1 is described since they may in any case be configured in a structurally identical manner. As can be seen in FIG. 1 in conjunction with the schematic illustrations of FIGS. 2, 3 and 4, the door apparatus has two vertically orientated guide rails 2, 3 which laterally delimit the access opening A. An outer door element 20 is displaceably supported in or on a vertically orientated outer guide 4 of the guide rails 2, 3. An inner door element 30 is displaceably supported in or on an inner guide 5 which extends in a parallel manner adjacent to the outer guide 4. The inner guide 5 is also formed by the guide rails 2, 3.

Figure 2:
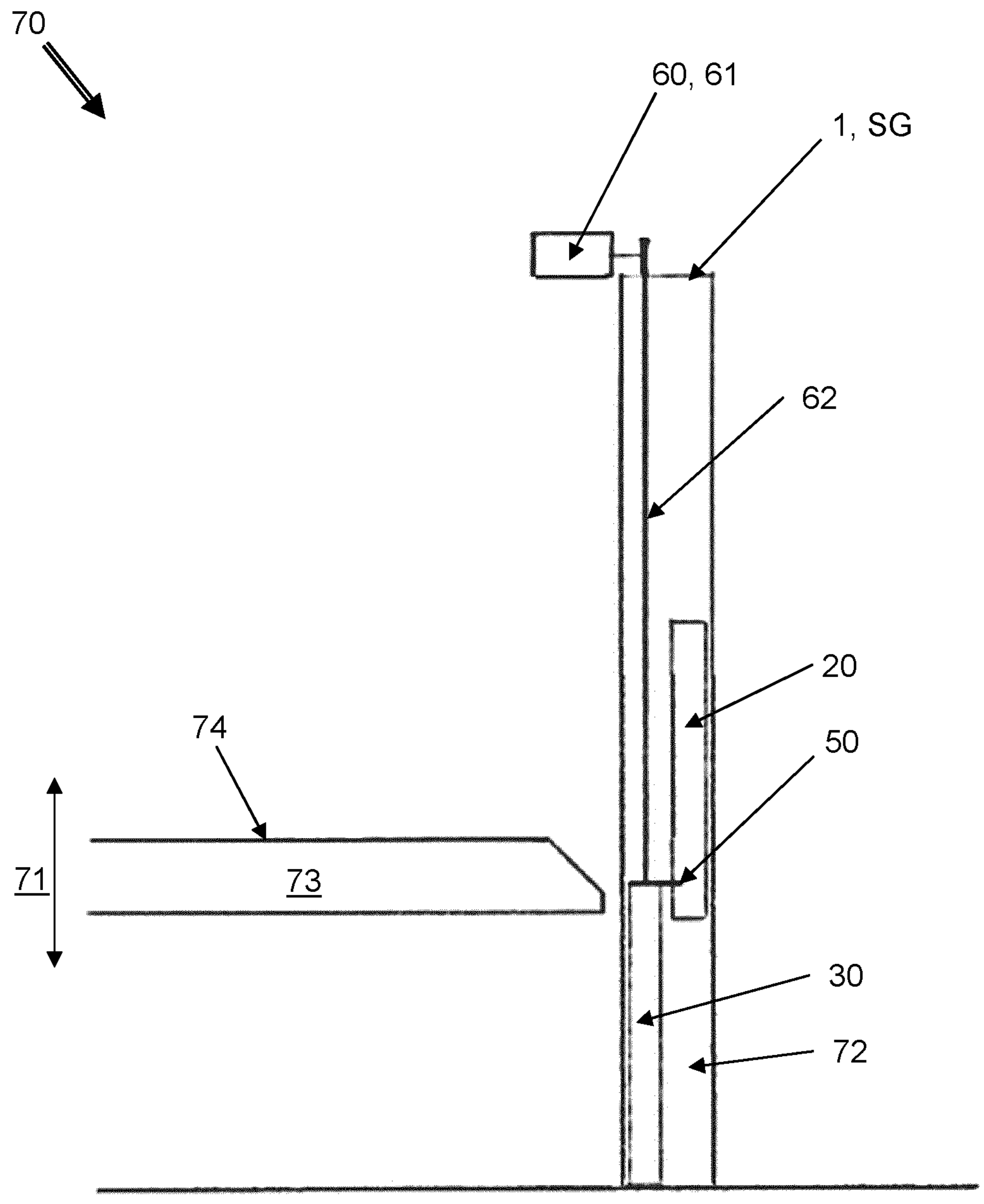
FIG. 2 shows a schematic side view of a parking apparatus having a door apparatus.
Figure 4:
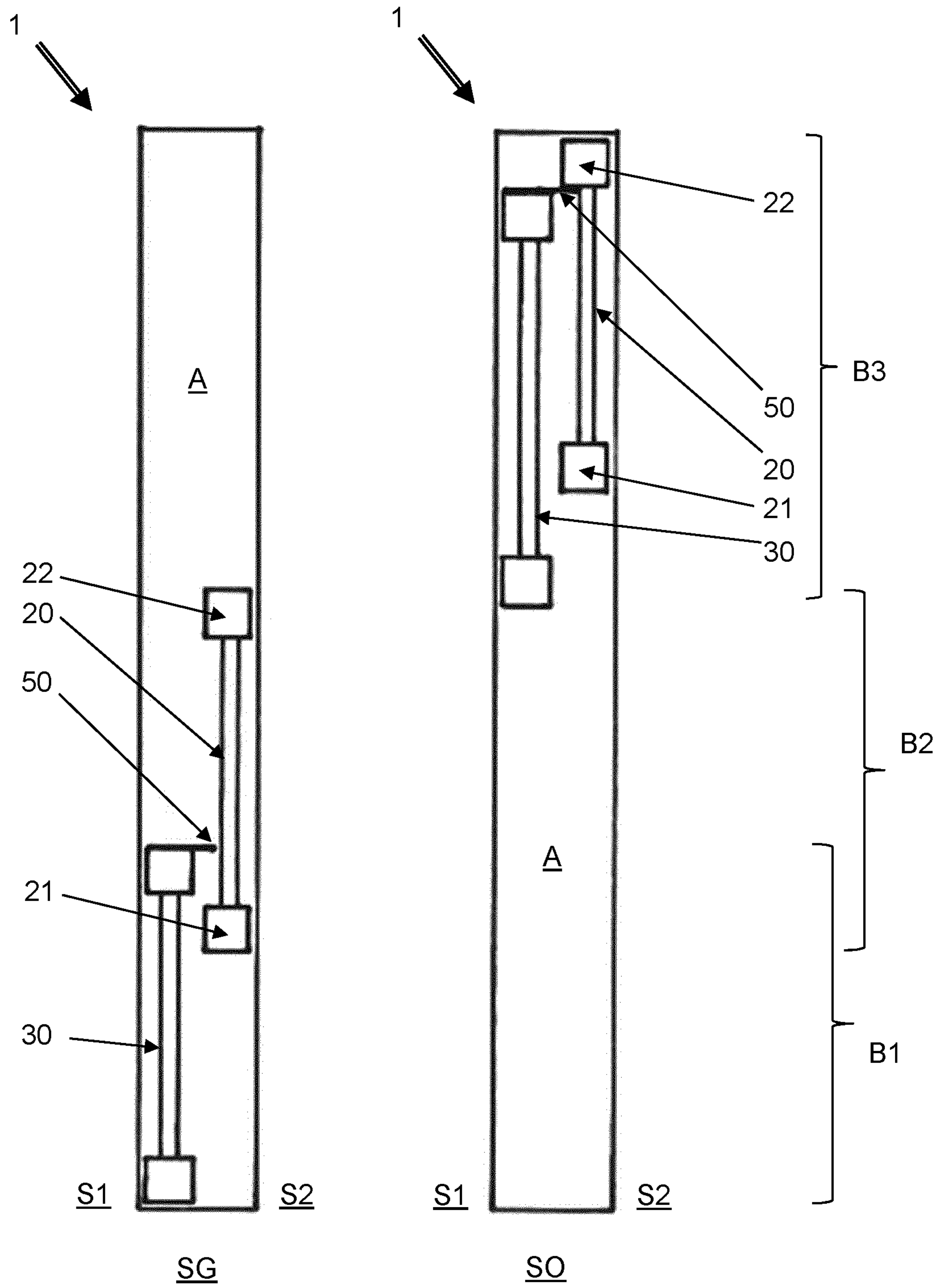
FIG. 4 shows a schematic illustration with two adjacent side views of a door apparatus in the closed position and in the open position.

In the shown closed position SG of the door apparatus 1, the inner door element 30 is in each case arranged in a first region B1 of the access opening A which is located lower than a second region B2, in which the outer door element 20 is arranged. The outer door element 20 and the inner door element 30 are arranged in an open position (cf. reference numerals SO in FIG. 4) of the door apparatus 1 in a third region B3 of the access opening A which is located in each case higher than the first and second regions B1, B2. As can be seen in FIGS. 2 and 4, the first and second regions B1, B2 intersect and the second and third regions B2, B3 intersect.

Figure 3:
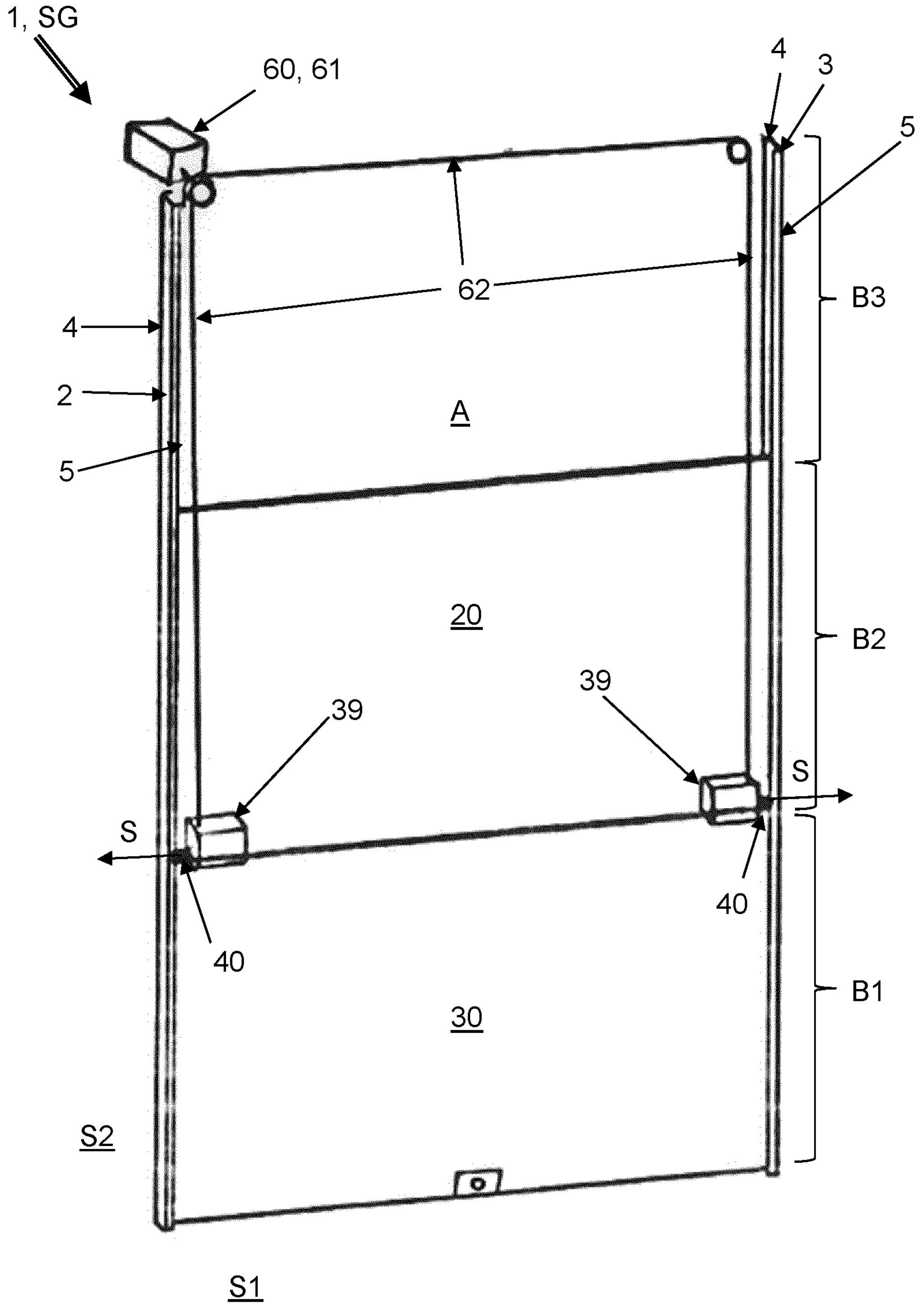
FIG. 3 shows a schematic rear view of a door apparatus.

With the locking element 40 of a locking apparatus 39 as illustrated in FIG. 3, a blocking state S can be brought about in which the locking element 40 blocks the displaceable bearing of the inner door element 30 relative to the two guide rails 2, 3 in the closed position SG.

Furthermore, the door apparatus 1 has a coupling element 50 which is schematically illustrated in FIGS. 2 and 4 and which can be arranged on one of the inner and outer door elements 20, 30 and, in this instance, is arranged at the upper end of the inner door element 30. The coupling element 50 cooperates with the outer door element 30 in such a manner that the locking element 40 blocks the displaceable bearing of the outer door element 20 in the blocking state S relative to the two guide rails 2, 3 indirectly via the inner door element 30. The coupling element 50 is thus in the form of a holding-down member. Stops on the guide rails 2, 3 with which the outer door element 20 is blocked with respect to movement into the first region B1 are not illustrated.

As can further be seen in FIGS. 2 and 4, the coupling element 50 cooperates with the outer door element 20 in such a manner that between the outer door element 20 and the inner door element 30 no gap can be pushed open. Instead, the coupling element 50 cooperates with the other of the inner and outer door elements 20, 30 in such a manner that the inner door element 30 can be pushed by at least 50% beside (or behind when viewed from the front) the outer door element 20. Furthermore, the coupling element 50 cooperates with the outer door element 20 in such a manner that the inner door element 30 during displacement into the third region B3 also pushes the outer door element 20 from the second region B2 into the third region B3. The coupling element 50 is thus in the form of a carrier. To this end, the coupling element 50 is constructed as a rigid non-movable element which is constructed or arranged on the inner door element 30. From here, the coupling element 50 protrudes in such a manner from the rear between an upper and a lower frame profile 21, 22 of the outer door element 20 that it is arranged in the closed position SG at the upper side adjacent to the lower frame profile 21 and in the open position SO is arranged at the lower side adjacent to the upper frame profile 22. Between the upper and lower frame profiles, the coupling element 50 can be simply pushed past the outer door element 20. Optionally, the coupling element 50 may have a plurality of individual elements which are arranged in a state distributed over the spacing between the two guide rails 2, 3 and which could, for example, also be configured in a structurally identical manner.

The schematic illustrations according to FIGS. 2 and 3 further show a lifting drive 60. In particular, the inner door element 30 is displaceably driven along the inner guide 5 with the lifting drive 60. The lifting drive 60 has a motor 61 which is arranged in the height range of the two upper ends of the two guide rails 2, 3. The motor 61 drives a chain 62 of the lifting drive 60 which is secured to the inner door element 30, according to FIG. 3 in particular indirectly via the locking apparatus 39. In contrast, the outer door element 20 is also driven exclusively indirectly by means of the inner door element 30 with the lifting drive 60.

The specific embodiment shown according to FIG. 3 makes provision for the locking element 40 to be coupled kinematically to the lifting drive 60 in such a manner that the locking element 40 in the closed position SG and when the lifting drive 60 or the chain 62 thereof is unloaded automatically takes up the blocking state S. If the lifting drive 60 is activated and the chain 62 is tensioned, the locking element 40 is unlocked.

The invention is not limited to one of the above-described embodiments but instead may be modified in various manners.

All of the features and advantages arising from the claims, description and drawings, including structural details, spatial arrangements and method steps, may be inventively significant both per se and in extremely varied combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Door apparatus
2 Guide rail
3 Guide rail
4 Outer guide
5 Inner guide
20 Outer door element
21 Lower frame profile
22 Upper frame profile
30 Inner door element
39 Locking apparatus
40 Locking element
50 Coupling element
60 Lifting drive
61 Motor
62 Chain
70 Parking apparatus
71 Movement device
73 Platform

74 Parking surface
A Access opening
B1 First region
B2 Second region
B3 Third region
S Blocking state
SG Closed position
SO Open position
S1 Inner side
S2 Outer side

The invention claimed is:

1. A door apparatus for closing an access opening, the door apparatus comprising:

two vertically oriented guide rails laterally delimiting the access opening;

an outer door element displaceably supported in or on a vertically oriented outer guide of the guide rails;

an inner door element displaceably supported in or on an inner guide of the guide rails, wherein the guide rails extend in a parallel manner adjacent to the outer guide, wherein, in a closed position of the door apparatus, the inner door element is arranged in a first region of the access opening and the outer door element is arranged in a second region of the access opening, the first region being located lower than the second region, and wherein, in an open position of the door apparatus, the outer door element and the inner door element are arranged in a third region of the access opening, the third region being higher than the first and second regions;

a locking element for bringing about a blocking state, wherein, in the blocking state, the locking element blocks a displaceable bearing of the inner door element relative to the guide rails in the closed position; and a coupling element on the inner door element and cooperating with the outer door element, or on the outer door element and cooperating with the inner door element, such that the locking element blocks a displaceable bearing of the outer door element in the blocking state relative to the guide rails indirectly via the inner door element.

2. The door apparatus as claimed in claim 1, wherein the coupling element cooperates with the inner or outer door element such that the inner door element can be pushed by at least 50% beside the outer door element.

3. The door apparatus as claimed in claim 1, wherein the coupling element cooperates with the inner or outer door element such that the inner door element during displacement into the third region also pushes the outer door element from the second region into the third region.

4. The door apparatus as claimed in claim 1, wherein the coupling element is a rigid non-movable element formed or arranged on the inner or outer door element.

5. The door apparatus as claimed in claim 1, wherein the coupling element is a carrier such that the inner door element also carries the outer door element in at least one operating state.

6. The door apparatus as claimed in claim 1, wherein the coupling element is a holding-down member such that the inner door element blocks the outer door element in at least one operating state against displacement in an upward direction.

7. The door apparatus as claimed in claim 1, wherein the coupling element is arranged on the inner door element.

8. The door apparatus as claimed in claim 7, wherein the coupling element protrudes between an upper and a lower frame profile of the outer door element such that the coupling element is arranged in the closed position adjacent to the lower frame profile and in the open position adjacent to the upper frame profile.

9. The door apparatus as claimed in claim 1, wherein the inner door element is displaceably driven along the inner guide with a lifting drive.

10. The door apparatus as claimed in claim 9, wherein the lifting drive has a motor.

11. The door apparatus as claimed in claim 10, wherein the lifting drive has a chain secured to the inner door element.

12. The door apparatus as claimed in claim 9, wherein the outer door element is exclusively also driven indirectly by the inner door element with the lifting drive.

13. The door apparatus as claimed in claim 9, wherein the locking element is coupled to the lifting drive in such a kinematic manner that the locking element, in the closed position and in an unloaded lifting drive state, automatically takes up the blocking state.

14. The door apparatus as claimed in claim 1, further comprising an emergency unlocking device by which the blocking state can be manually cancelled.

15. A parking apparatus for parking vehicles, at least comprising:

at least one platform positionable by a movement device relative to an access opening with a parking surface; and a door apparatus as claimed in claim 1 arranged in the access opening.

16. The door apparatus as claimed in claim 1, wherein the coupling element cooperates with the inner or outer door element such that the inner door element can be pushed by at least 60% beside the outer door element.

17. The door apparatus as claimed in claim 1, wherein the coupling element cooperates with the inner or outer door element such that the inner door element can be pushed by at least 70% beside the outer door element.

18. The door apparatus as claimed in claim 1, wherein the coupling element cooperates with the inner or outer door element such that the inner door element can be pushed by at least 80% beside the outer door element.

* * * * *